United States Patent
Quirk et al.

(10) Patent No.: US 8,279,915 B2
(45) Date of Patent: ***Oct. 2, 2012

(54) SYSTEM AND METHOD FOR TRANSMITTER TRAINING

(75) Inventors: Jay Quirk, Kanata (CA); Matthew Brown, Kinburn (CA)

(73) Assignee: Applied Micro Circuits Corporation, San Diego, CA (US)

( * ) Notice: Subject to any disclaimer, the term of this patent is extended or adjusted under 35 U.S.C. 154(b) by 841 days.

This patent is subject to a terminal disclaimer.

(21) Appl. No.: 12/423,768

(22) Filed: Apr. 14, 2009

(65) Prior Publication Data

US 2010/0260250 A1 Oct. 14, 2010

(51) Int. Cl.
*H03H 7/30* (2006.01)

(52) U.S. Cl. ............ 375/232

(58) Field of Classification Search ............ 375/232
See application file for complete search history.

(56) References Cited

U.S. PATENT DOCUMENTS

| | | | | |
|---|---|---|---|---|
| 4,575,857 A | * | 3/1986 | Murakami | 375/230 |
| 5,414,732 A | * | 5/1995 | Kaufmann | 375/232 |
| 5,825,818 A | * | 10/1998 | Kaku et al. | 375/232 |
| 6,411,650 B1 | * | 6/2002 | Okita | 375/232 |
| 7,421,022 B2 | * | 9/2008 | Choudhary et al. | 375/233 |
| 2006/0245486 A1 | * | 11/2006 | Choudhary et al. | 375/233 |
| 2010/0020860 A1 | * | 1/2010 | Dai et al. | 375/231 |

OTHER PUBLICATIONS

IEEE802.3Clause72, "Carrier Sense Multiple Access with Collision Detection (CSMA/CD) Access Method and Physical Layer Specifications Amendment 4: Ethernet Operation over Electrical Backplanes", IEEE May 22, 2007 pp. 77-110.*

* cited by examiner

*Primary Examiner* — Juan A Torres
(74) *Attorney, Agent, or Firm* — Law Office of Gerard Maliszewski; Gerard Maliszewski

(57) ABSTRACT

A system and method are provided for ordering tap setting modifications in a link partner using a plurality of voltage gain taps, while avoiding minimum and maximum limitations. Provided is a link partner (LP) transmitter having a parallel selectable voltage gain taps. The method sends messages from a network-connected local device (LD) directing the LP to generally change the gain setting of either the pre-tap or the post-tap, as follows. The gain setting of selected tap is changed in the desired direction of modification and then the center tap gain settings is maximally increased until a limit signal is received. If a selected tap increment is desired, the center tap is initially decremented more steps than the desired change in the selected tap.

12 Claims, 8 Drawing Sheets

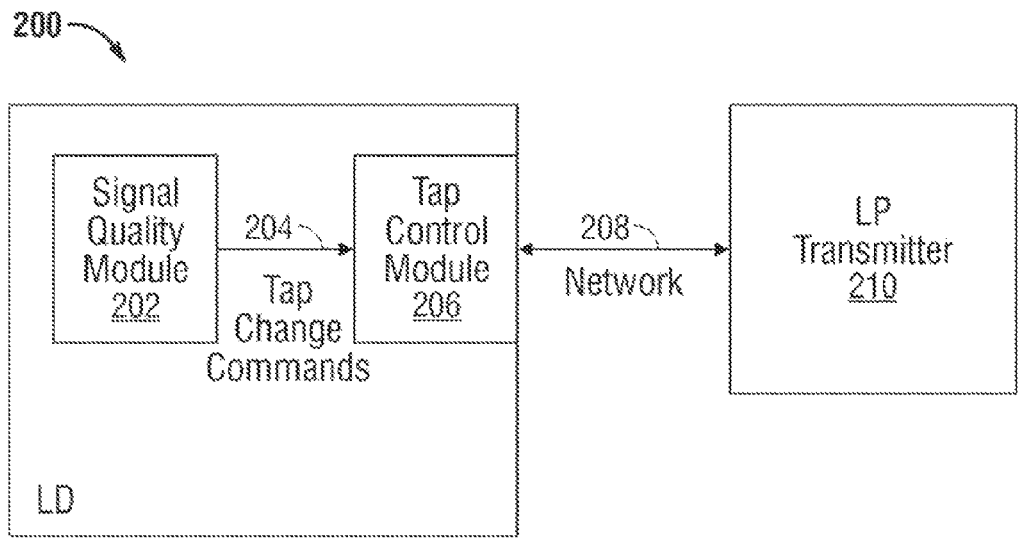
FIG. 2
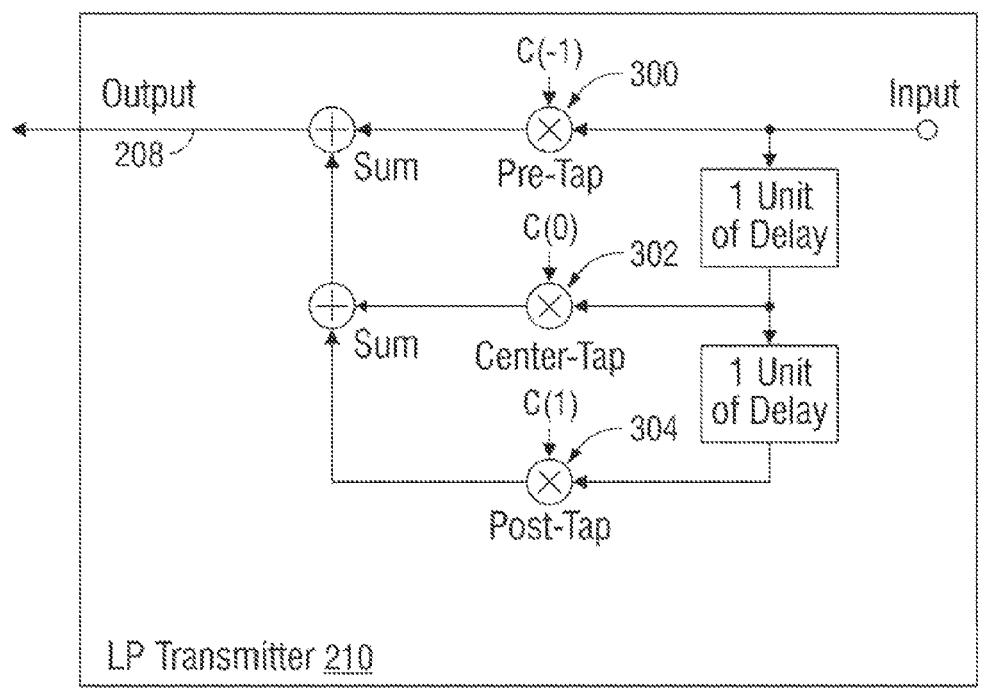
FIG. 3 *(PRIOR ART)*

SYSTEM AND METHOD FOR TRANSMITTER TRAINING

BACKGROUND OF THE INVENTION

1. Field of the Invention

This invention generally relates to communication system link parameters and, more particularly, to a system and method for adjusting the gain levels of a multi-tap transmitter using commands from a communicating receiver.

2. Description of the Related Art

IEEE 802.3, Clause 72 defines a protocol, referred to hereafter as KR Training, to be used for a local device (LD) to adjust three different transmitter taps of a link partner (LP): the center tap, the post cursor tap (post-tap), and the precursor tap (pre-tap). The center tap settings are always a positive value, while the post cursor and precursor taps may be set to positive or negative values. When using KR Training to manipulate transmitter taps, three factors serve to limit the range of the transmitter taps. The first factor is the physical limit of the transmitter taps, referred to herein as the static limit. This limit is unique to each transmitter tap and is not dependent upon the value of the other transmitter taps. The other two factors are dynamic limits, in that these limits are dependent upon the current value of all the transmitter taps. One dynamic factor is the maximum swing voltage. This is the maximum voltage allowed by the transmitter. The output signal through the combination of transmitter taps must not exceed this voltage. The final factor limiting the transmitter taps is the minimum steady state voltage. This is the minimum voltage allowed by the transmitter. The center tap reduced by the absolute value of the post and pre cursor taps must not fall below this voltage.

For instance, reducing the precursor tap can cause the differential voltage resulting from combining all of the taps to reach the maximum limit. Once the combined maximum for all the taps is reached, the center tap cannot be increased, nor can the post cursor tap or pre-cursor tap be decreased. A tap change request can only change the value of a (requested) coefficient. The transmitter does not adjust the center tap, for example, in response to a pre/post cursor tap request.

FIG. 1 is a diagram depicting the maximum swing voltage and minimum steady state voltage limits (prior art). KR Training provides three possible transmitter responses to any tap request, they are: maximum, minimum, and updated. The maximum and minimum statuses indicate that the transmitter has been adjusted to reach a static or dynamic limit. Further, the maximum/minimum response gives no indication of whether the request was actually performed. That is, response may be the result of a tap change being performed, or if the transmitter was already in a limit condition, the response may be result of no tap change. Thus, a maximum/minimum limit response does not enable the LD to determine if a tap change was performed, or what kind of limit was encountered.

One possible solution to this problem is to perform a three-step change every time a single-step change is desired. Thus, if a tap increment is desired, a tap decrement is performed, followed by two tap increments. This "backing off" should permit the determination of maximum swing limits for the current configuration of the other two taps. However, if either of the other taps is changed, the maximum swing limit will also change. If the other taps are not adjusted, the current tap may be limited by the maximum swing voltage and the full range of tap values is not accessible by the LD.

Alternately, the center tap can be lowed significantly, to create buffer for pre and post cursor taps adjustments. When the pre and post-tap adjustments are completed, the center tap can be incremented to maximum. The problem with this approach is that the number of steps needed to lower center tap is unknown, and experimentation may be required until a clear signal is received. Lowering the center tap to permit the hitting of the maximum swing voltage limit restricts the pre and post-tap movements, as the transmitter is now closer to the steady state voltage limit.

Another approach is to use the initialize state, to begin at a specific value. When the minimum/maximum limits are hit, initialization is performed to go to the known state, and then adjustments can be made to discover the peak values. However, the initialize state is likely to already be near the maximum settings, which would require the center tap to be reduced to affect the other taps.

It would be advantageous if a method of using KR Training messages existed to adjust a LP's transmitter taps, so that static and dynamic limits could be detected and avoided.

SUMMARY OF THE INVENTION

Disclosed herein are a system and method to resolve ambiguity in the transmitter tap status of a link partner (LP) during KR Training, as defined in IEEE 802.3 clause 72. Clause 72 defines a protocol of coefficient and status messages that a local device (LD) can utilize to adjust a LP's transmitter taps. The LD uses these messages to optimize the LP's transmitter for use in a link with the LD's receiver.

It is assumed that the best results are obtained by keeping the LP transmitter at the maximum setting. This is best done by ensuring that the center tap is at its maximum setting given the state of the other taps. Therefore, the tap adjustment algorithm focuses on requests for moving the pre and post-taps. The center tap is only moved to support the pre and post tap movements and is maintained at its maximum possible setting.

Accordingly, a method is provided for ordering tap setting modifications in a link partner using a plurality of voltage gain taps, while avoiding minimum and maximum limitations. Provided is a link partner (LP) transmitter having a signal input, a plurality of parallel selectable voltage gain taps connected to the signal input, including a non-delayed pre-tap, a center tap with a delay of one unit, and a post-tap with a delay of 2 units. A network-connected output supplies the sum of the taps. The method sends messages from a network-connected local device (LD) directing the LP to generally change the gain setting of either the pre-tap or the post-tap, as follows. The gain setting of selected tap is changed in the desired direction of modification and then the center tap gain settings is maximally increased until a limit signal is received.

More explicitly, messages may be sent from the LD directing the LP to increase the difference between the selected tap gain setting and a zero tap setting. Prior to increasing the selected tap gain setting, the gain setting of the center tap is decreased a first number of steps. Then, the difference between the selected tap gain setting and the zero setting is increased a second number of steps, less than the first number, followed by the maximal increase in the center tap gain settings.

Alternately, messages are sent from the LD directing the LP to decrease the difference between the selected tap gain setting and a zero tap setting. Then, the difference between the selected tap gain setting and the zero setting is decreased a second number of steps, followed by the maximal increase in the center tap settings.

Additional details of the above-described method and, an LD system for ordering tap setting modifications in an LP using a plurality of voltage gain taps, are provided below.

BRIEF DESCRIPTION OF THE DRAWINGS

FIG. 2 is a schematic block diagram of a local device (LD) system for ordering tap setting modifications in a link partner (LP) using a plurality of voltage gain taps, while avoiding minimum and maximum limitations.

FIG. 3 is a more detailed schematic block diagram of the LP transmitter of FIG. 2.

DETAILED DESCRIPTION

Figure 1:
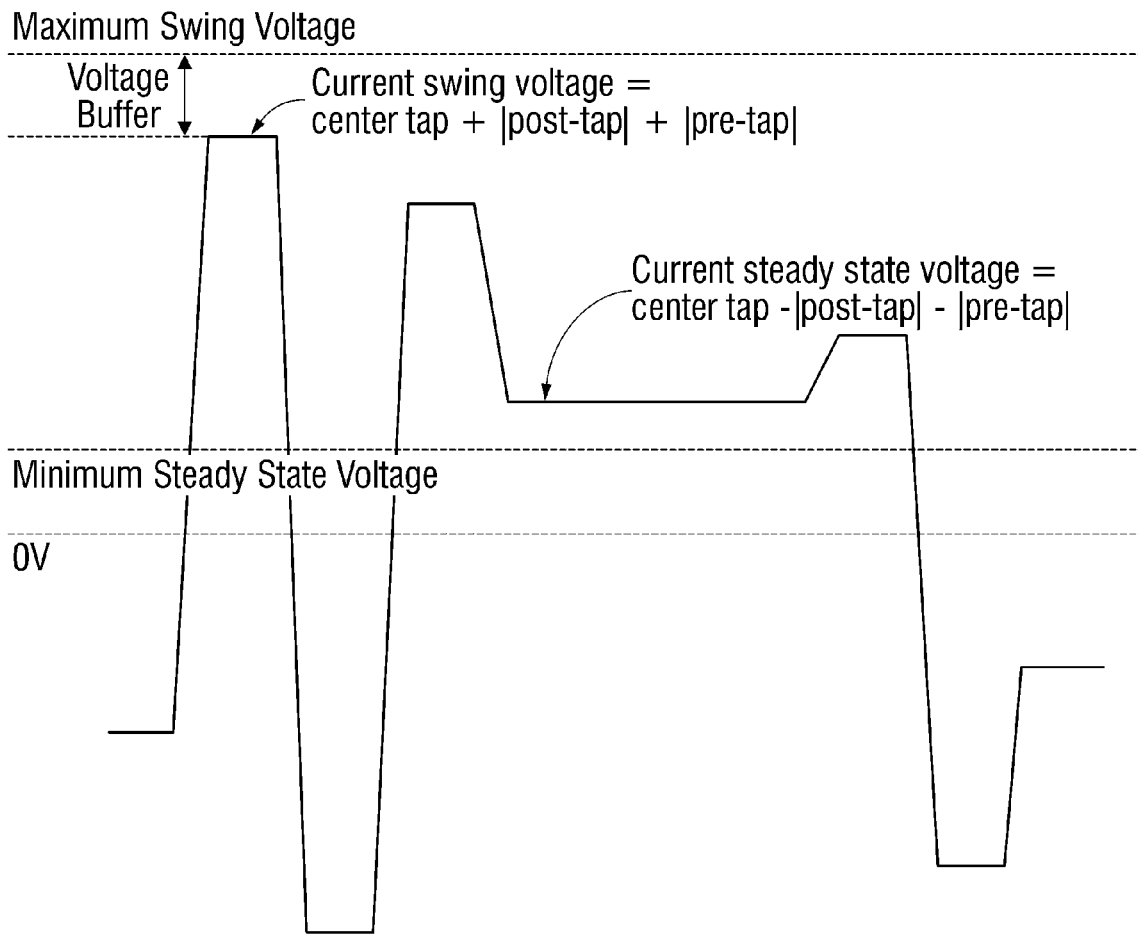
FIG. 1 is a diagram depicting the maximum swing voltage and minimum steady state voltage limits (prior art).

FIG. 2 is a schematic block diagram of a local device (LD) system for ordering tap setting modifications in a link partner (LP) using a plurality of voltage gain taps, while avoiding minimum and maximum limitations. The system 200 comprises an LD signal quality module 202 having an output on line 204 to supply either pre-tap or post-tap change commands. An LD tap control module 206 has an input to accept the tap change command and a network interface on line 208 to supply a sequence of tap modification signals to an LP transmitter 210. In one aspect, the LD tap control module sends tap change commands in accordance with the IEEE 802.3, Clause 72 training procedure.

It should be understood that the LD device is a transceiver including a receiver section (not shown), and that the LD device typically includes upper and lower layers (not shown), as expressed by the International Organization for Standardization (ISO) 7-layer model. It should also be noted that the linkage between the LD and LP is bi-directional, and that the LP device may requests changes in the transmitter tap settings of the LD.

FIG. 3 is a more detailed schematic block diagram of the LP transmitter of FIG. 2. The LP transmitter 210 has a plurality of parallel selectable voltage gain taps connected to a signal input, including a non-delayed pre-tap 300, a center tap 302 with a delay of one unit, and a post-tap 304 with a delay of 2 units. The LP transmitter 210 has a network-connected output on line 208 to supply the sum of the taps. It should be understood that the LP device is a transceiver including a receiver section (not shown), and that the LP device typically includes upper and lower layers (now shown).

Contrasting FIGS. 2 and 3, the LD tap control module 206 sends a sequence of tap modification signals, directing the LP transmitter 210 to change the gain setting of selected tap in the desired direction of modification, and as a final step, maximally increase the center tap gain settings until a limit signal is received. It should be understood that only one tap can only be modified per each LD instruction, and that each tap adjustment need not be performed in a single step. Thus, the process of changing the selected step in the desired direction may require a series of instructions by the LD, where each instruction is followed by a reply from the LP of either maximum/minimum limit or updated (no limit encountered). Likewise, the process of maximally increasing the center tap, until a (maximum/minimum) limit signal is obtained, may require a series of LD instructions, as the center tap may be incremented in steps of one unit.

In one aspect, the LD signal quality module sends a message to increase the difference between the selected tap gain setting and a zero tap setting. The LD tap control module sends a sequence of tap modification signals including directions to decrease the gain setting of the center tap a first number of steps. Then, the difference between the selected tap (e.g., pre-tap) gain setting and the zero setting is increased a second number of steps, less than the first number. Finally, the center tap gain setting is maximally increased until a limit signal is received.

Figure 4A:
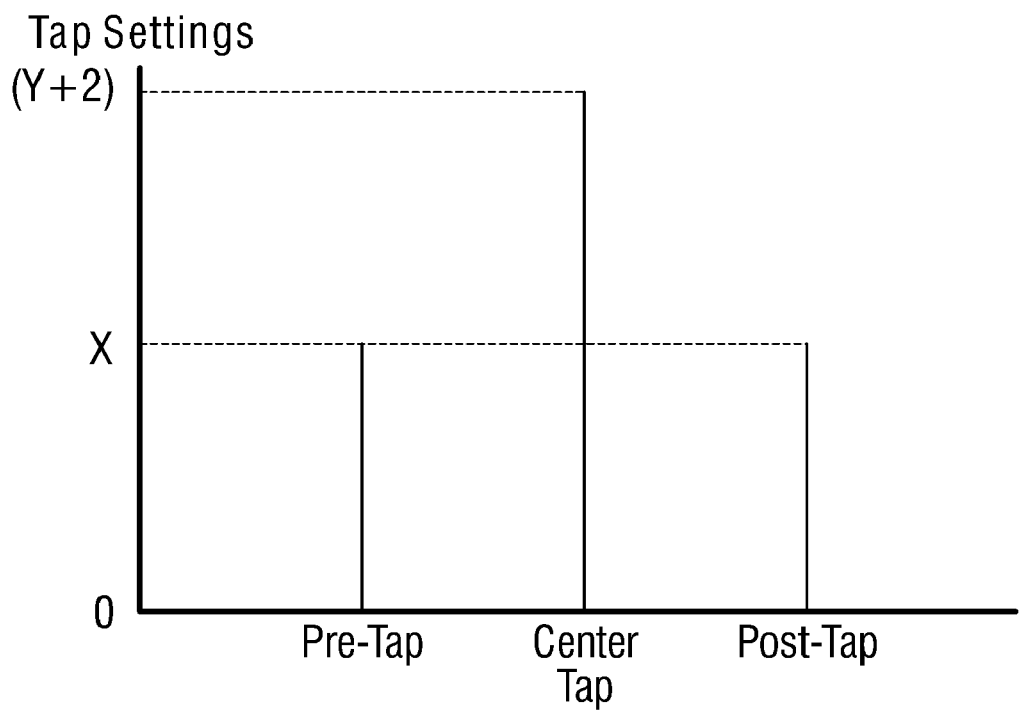
FIGS. 4A through 4D represent an exemplary process for increasing the pre-tap setting one step.
Figure 4B:
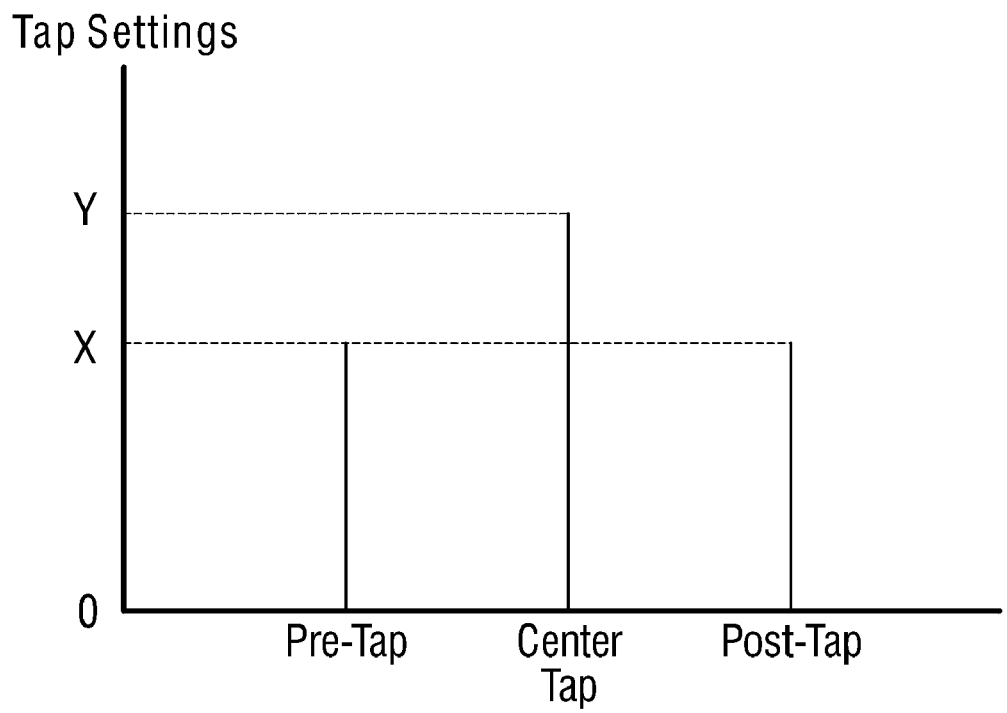
Figure 4C:
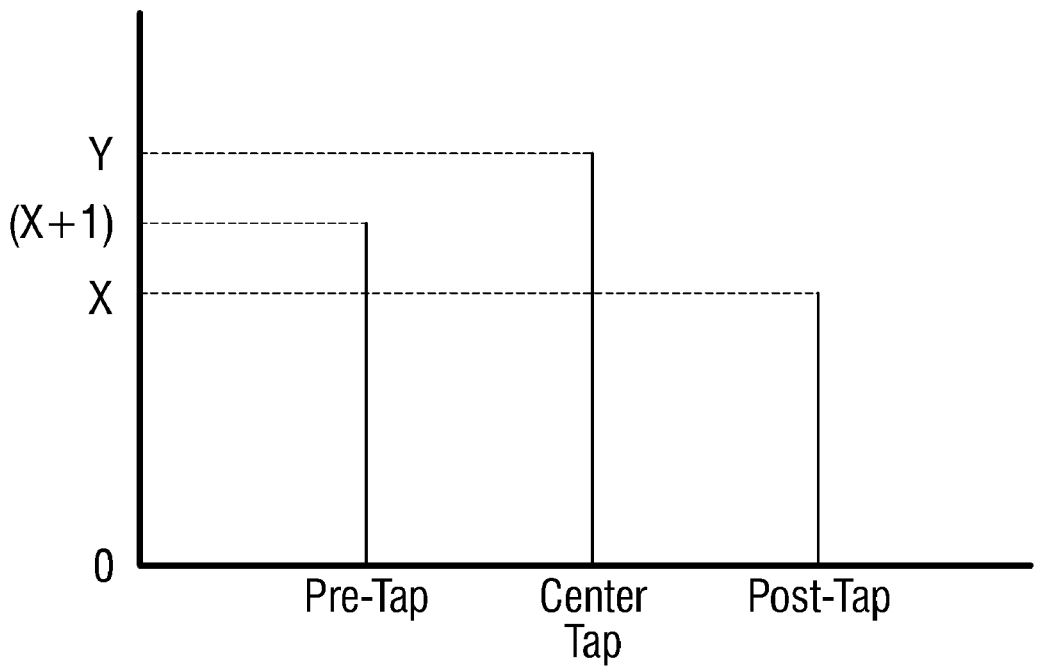
Figure 4D:
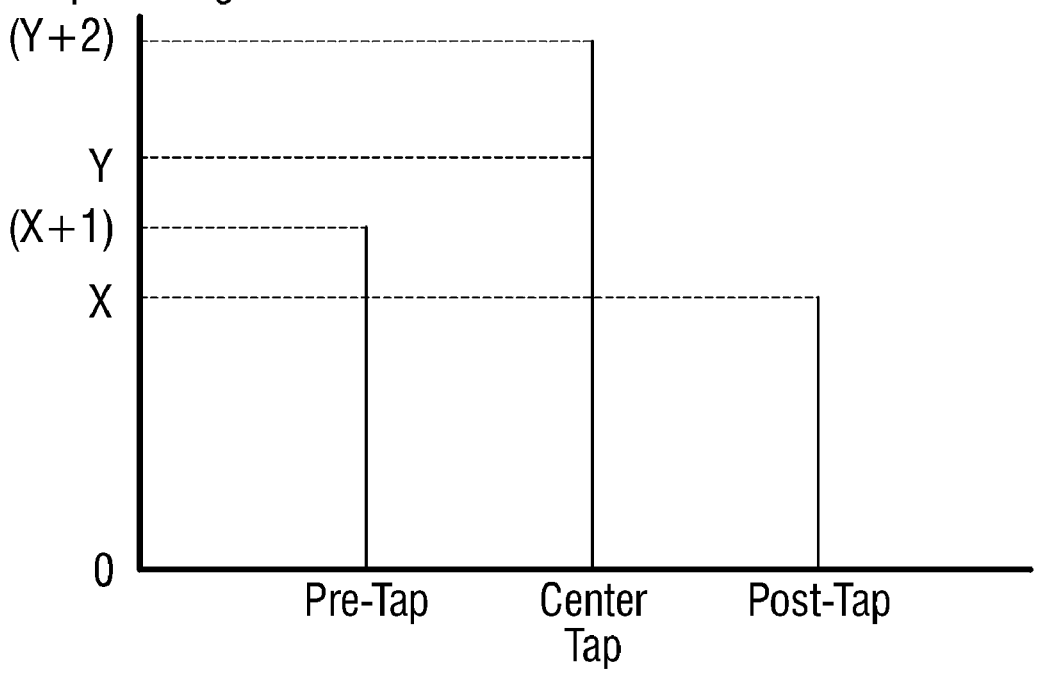

FIGS. 4A through 4D represent an exemplary process for increasing the pre-tap setting one step. In one aspect, the first number of steps is 2 and the second number of steps is 1. For example, FIG. 4A represents the initial state of the LP transmitter taps. Both the pre-tap and post-tap have an initial setting of X, and the center tap has a setting of (Y+1). In this example it is assumed that the pre-tap has been selected. In FIG. 4B, the center tap setting is decreased from (Y+2) to Y. In Step 4C the pre-tap setting is increased from X to (X+1). In FIG. 4D the center tap setting is increased from Y to Y+2. It should be understood that the first and second number are not limited to the above-mentioned example.

More explicitly, the LD directs the LP to increase the difference between the selected tap gain setting and a zero tap setting n number of steps, where n≧1 and x is initially =zero. Then, the gain setting of the center tap is decreased 2 steps in iteration x. Continuing in iteration x, the selected (pre) tap difference is increased 1 step, if a minimum/maximum limitation has not been signaled in response to decreasing the center tap setting 2 steps. To finish iteration x, the center tap gain is maximally increased. Then, the LD tap control module adds 1 to x, and if x is not equal to n, directs to LP to perform another iteration. Although a process for increasing a pre-tap has been described, it should be understood that the process for increasing the post-tap is the same.

Returning to FIG. 2, in a different scenario the LD signal quality module 202 sends a message to decrease the difference between the selected tap gain setting and a zero tap setting. Then, the LD tap control module 206 sends a sequence of tap modification signals including directions to decrease the difference between the selected tap gain setting and the zero setting a second number of steps, followed by directions to maximally increase the center tap gain settings until a limit signal is received.

Figure 5A:
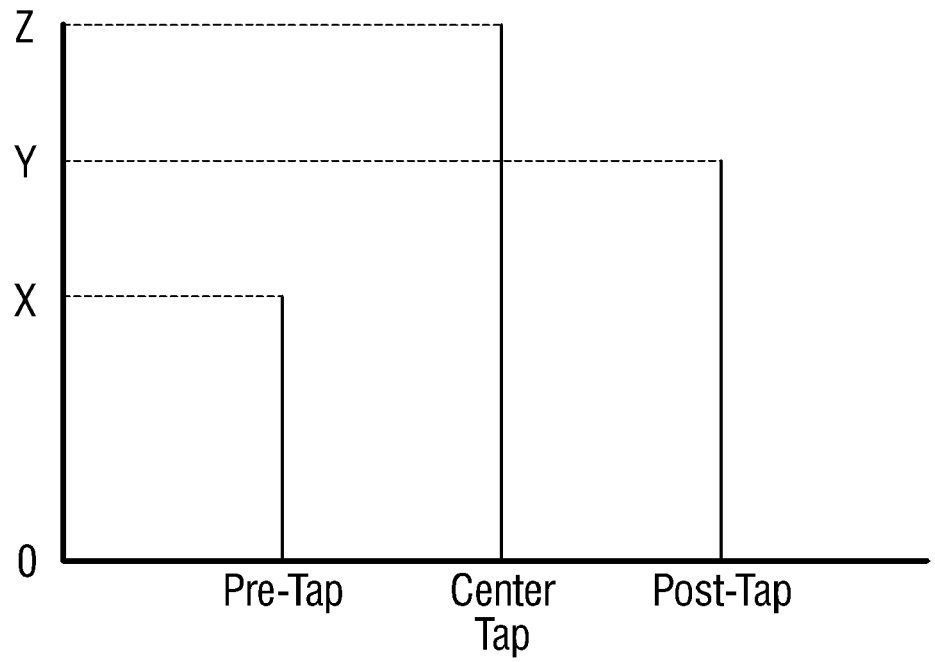
FIGS. 5A through 5E represent an exemplary process for decreasing the post-tap setting n steps, where n=2.
Figure 5B:
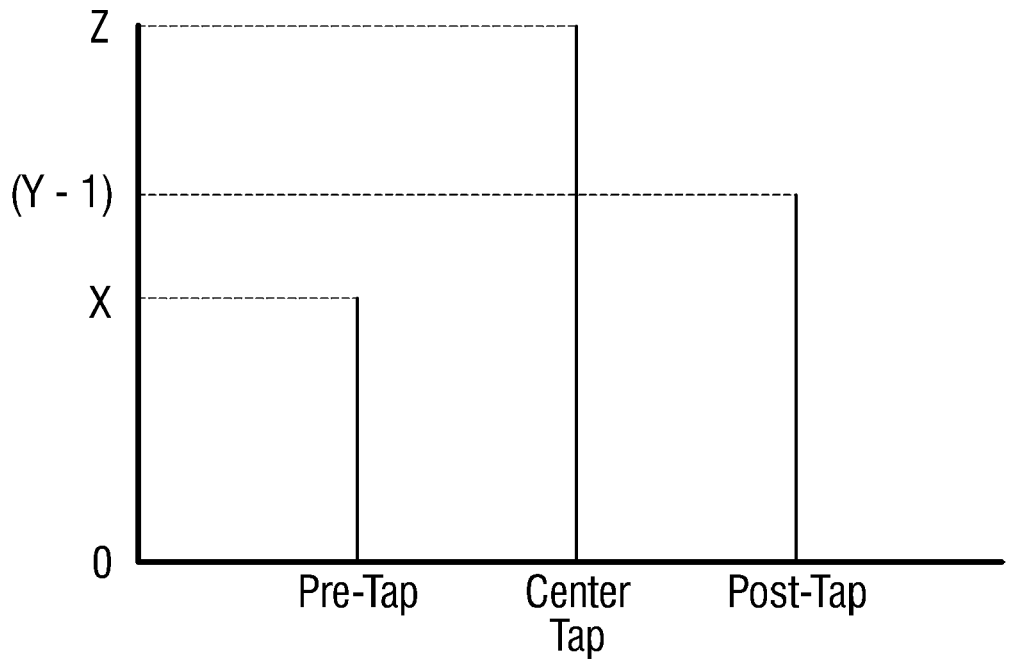
Figure 5C:
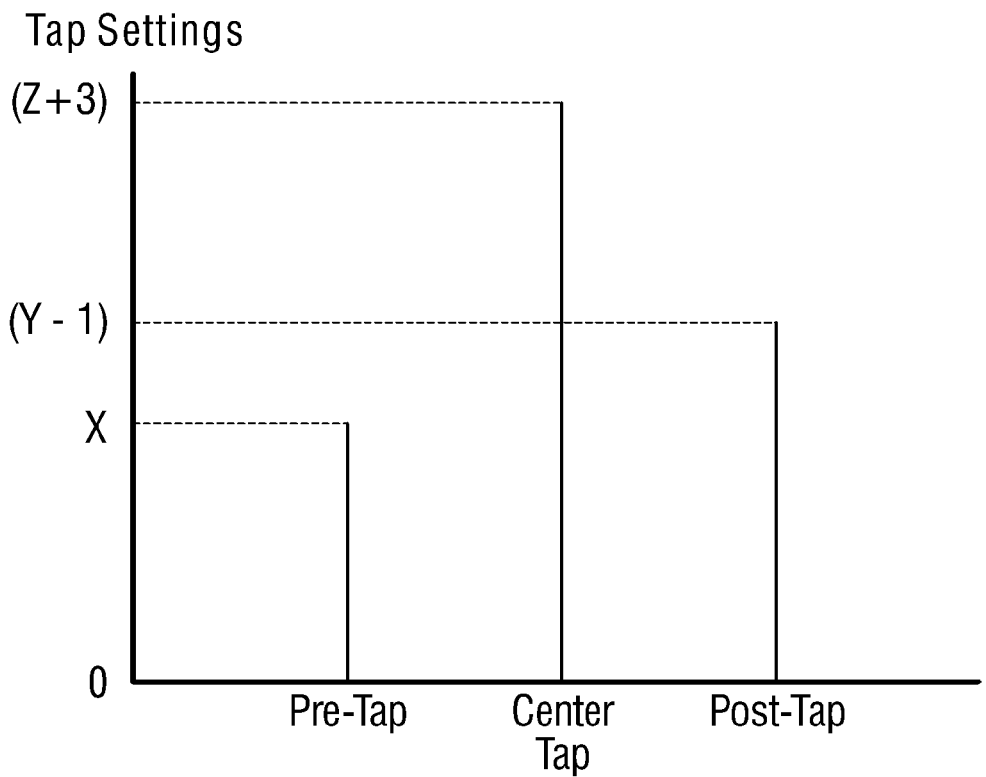

FIGS. 5A through 5C represent an exemplary process for decreasing the post-tap setting n steps, where n=2. As in the example of FIGS. 4A-4D, the second number of steps is equal to 1. In this example, the post-tap is selected and n=2. In FIG. 5A the LD directs the LP to decrease the difference between the selected tap (post-tap) gain setting and a zero tap setting n number of steps, where n≧1 and x is initially =zero. In FIG. 5B the selected (post) tap difference is decreased 1 step in iteration x. The post tap setting is decreased to (Y−1) from Y. Continuing iteration x, in FIG. 5C the center tap gain is maximally increased. As shown, the center tap setting has been changed from Z to (Z+3). Then, the LD tap control module adds 1 to x, and if x is not equal to n, directs the LP to perform another iteration.

Figure 5D:
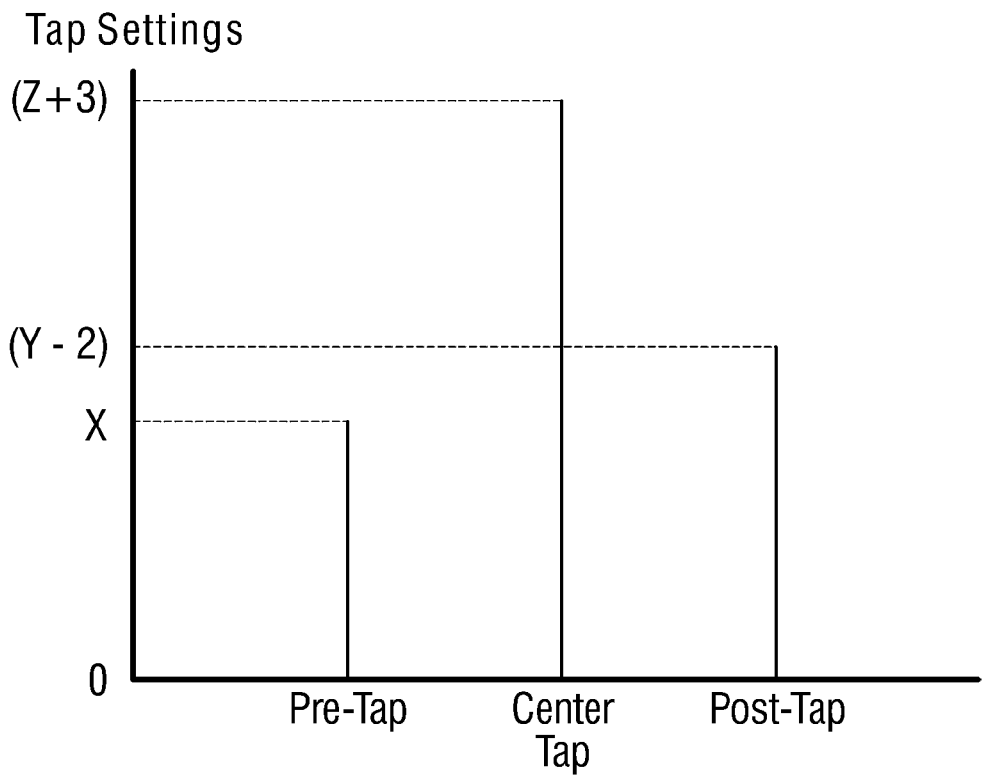
Figure 5E:
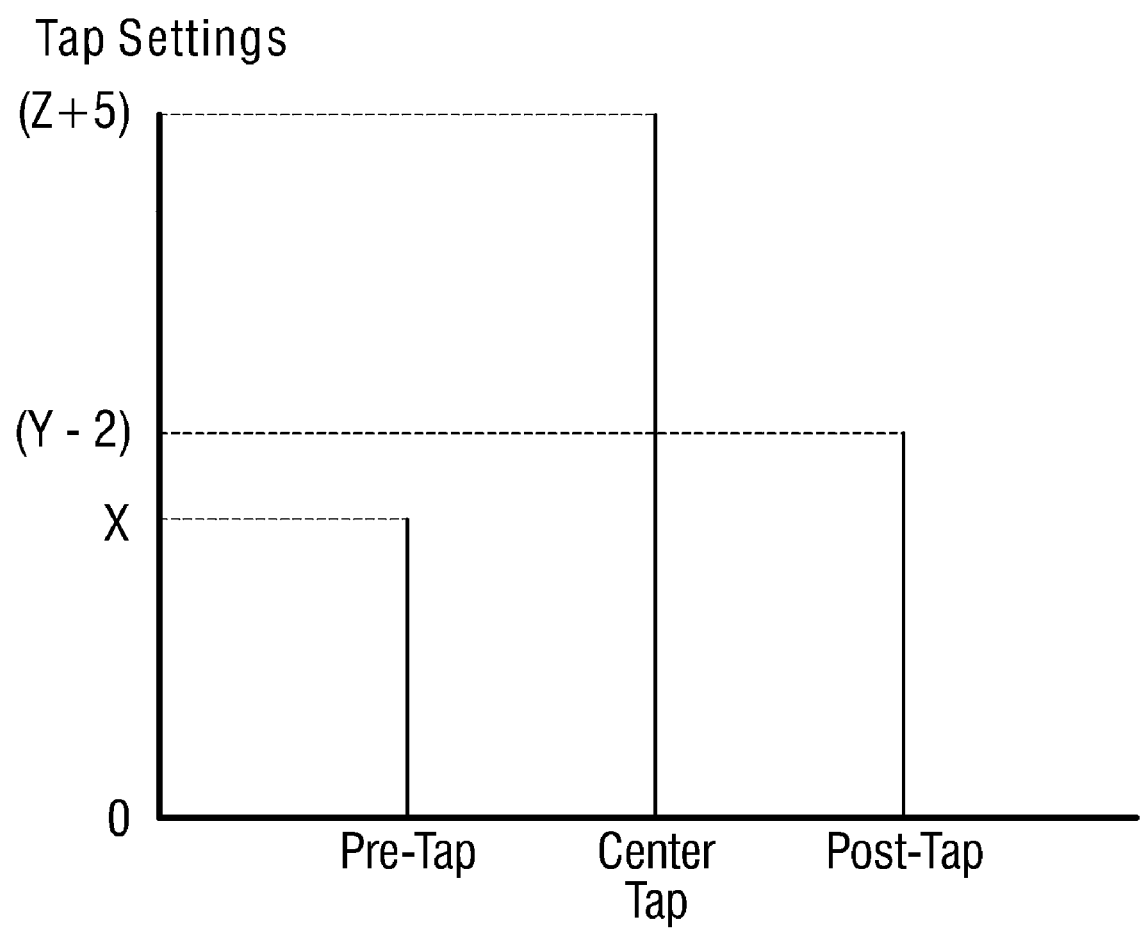

Since x (1) is not equal to n (2), another iteration is performed. In FIG. 5D the post-tap setting is decreased from (Y−1) to (Y−2). Then, in FIG. 5E the center tap gain setting is maximally increased from (Z+3) to (Z+5). At the end of this iteration, 1 is added to x. Since x now equals n, the tap adjustment process is complete.

Once the tap adjustments are made and the training procedure completed, the LP and LD units may communicate Ethernet data at a rate of 10 gigabit per second (10 G) or 1 G. It should be understood that the actual data rates may be higher or lower than 1 G and 10 G to line coding, e.g., 64 B/66 B for 10 G. It should also be understood however, that the above-described system is not necessarily limited to any particular message protocol or data rate.

The above-described LD modules may be enabled in hardware using logic circuitry or programmable gate arrays. These modules may also be enabled, or partially enabled as processor software instructions stored as an application in memory (not shown), and executed by a processor (not shown).

FUNCTIONAL DESCRIPTION

The purpose of KR Training, IEEE 802.3 Clause 72, is to provide a method to alter the transmitter taps of an LP, so that an LD receiver can better acquire the incoming signal. The receiver measures the quality of the incoming signal for different transmitter tap settings. There are many different means of measuring quality. In one aspect, eye measurements are used.

The transmitter taps are in essence a filter applied to the LP transmitter. This filter shapes the transmitted signal. Depending on the characteristics of the channel and the characteristics of the receiver, the transmitter tap weights are set to different values so that the LD receives the highest quality signal possible (i.e. the best eye measurement). The LD system described in FIG. 2 acts to improve signal quality by maximizing the LP transmitter voltage, to provide a larger SNR. In addition to keeping the transmitter working at maximum voltage (for the best SNR), the algorithm provides a method of enabling tap weight changes while maintaining the maximum transmitter voltage on the output.

As for the initialize state, the KR Training system defined in IEEE 802.3 Clause 72 defines a number of commands which can be sent between a LP and a LD to change the transmitter taps. For the most part, these commands increment or decrement any one of the three taps by 1 step. There are two additional commands used to alter the taps. The first command is called 'PRESET'. When a PRESET command is received, the pre and post cursor taps are set to 0 and the center tap is set to its maximum value. The second command is called 'INIT' or initialize. These tap values set the transmitter taps to a value such that a specific ratio between all three tap levels is achieved. This ratio is defined in Clause 72. The exact value of the taps is not defined, only the ratio. When KR Training first begins, the transmitter taps must be set to the INIT values.

The LD system described above sets a voltage buffer on the LP transmitter taps to prevent the dynamic limit from affecting tap requests. This methodology permits the LD to access a wider range of transmitter tap settings, which can increase signal integrity at the LD receiver. In order to receive the best signal-to-noise ratio (SNR) at the LD receiver, it is to the LD's advantage to have the LP maximize its transmitter taps to provide as large a signal as possible. In this state, the LP reaches its maximum swing voltage. If the LD then requires a transmitter tap to be adjusted in a direction away from 0, it is not immediately possible as that would serve to further increase the LP's swing voltage. In order to effect this change, the LD must first alter the LP's transmitter taps so the transmitter is not operating at the maximum swing voltage. This is accomplished by requesting the LP to alter a different transmitter tap by one or more steps. This tap manipulation creates a voltage buffer between the LP's current swing voltage and its maximum swing voltage. The size of the buffer must be large enough to ensure that a single change in a LP transmitter tap will not cause the LP to reach its maximum swing voltage.

If the maximum swing voltage is reached, it is possible that either a maximum or minimum limit status can be returned, but the LD has no means of determining if the status is due to the dynamic or static limit of the tap. By ensuring that the maximum swing voltage is not reached, the LD "knows" that a maximum or minimum limit status received from the link partner is due to the static tap limits or to the minimum steady state limit.

After such a tap adjustment, the changes in the LP's transmitter tap create a voltage buffer that can be reversed such that the LP is operating at its maximum swing voltage. This is done in order to provide as large a signal as possible to the LD's receiver and increase SNR.

Incrementing the post/precursor taps can only reduce the swing voltage and increase the steady state voltage of the driving signal. So a maximum limit that is received in response to a pre/post cursor tap movement should only represent a limit associated with that tap and not a dynamic limit caused by other taps.

If a decrement in the pre/post taps is required, it must be ensured that the tap is not already at the minimum value and that a decrement request results in a decrement of that tap. Assuming that process begins with the maximum peak to peak limit, the center tap must be decremented to permit a decrement in the pre/post tap. Furthermore, the assumption is made that a single step movement in the center tap is at least as large as a single step movement in the post/pre cursor taps. In cases where this assumption is not true, the center tap movements described herein can be increased to account for the smaller step size of the center tap.

Thus, a decrement in the center tap reduces the maximum voltage of the far end transmitter by at least one pre/post cursor tap step. If a reduction in the center tap results in a minimum limit response, it can be determined that the center tap has hit its bottom static limit or the minimum steady state voltage condition has been encountered.

If minimum limit response is not received, the tap has been successfully moved. If the minimum limit is received, then the bottom static limit of the tap or a maximum swing voltage limit has been encountered. If a minimum limit response was not received from the center tap movement, it is determined that the cause of the minimum limit is a result of the pre/post-tap movement. If a minimum limit response was received from the center tap movement, it cannot be determined if a subsequent pre/post tap movement occurred. If the pre/post cursor tap movement was successful, the center tap is maximally increased, and the tap control module of the LD is notified that the tap movement for the pre/post cursor was successful.

If the tap movement was unsuccessful, the LP can be caused to initialize, to put the taps in a deterministic state. By storing a record of changes, the tap control module can move the center and pre/post-taps to their required settings after initialization.

Being able to reliably move the taps to a previous known location is an important advantage. At the start of training the link partner's taps are typically set at arbitrary, unknown settings. An initial signal quality check can be performed in this state, and one of the LPs taps is adjusted, e.g., the precursor tap. Another signal quality check is than performed. The post cursor tap is adjusted and a signal quality check is performed once again. This process is repeated multiple times by adjusting different taps until at some point, the training algorithm makes a decision about which tap setting is considered optimal. The training algorithm then sends messages to the link partner so that the tap settings can be returned to that optimal state.

Thus, after finishing the training algorithm, the LD has discovered the optimal tap settings. Subsequent to finding the optimal settings, the LD may request, for example, one precursor tap decrement and one post cursor tap decrement. However, to return to the already determined optimal settings may not be as simple as simply reversing the changes.

If directions are given to simply increment the post cursor tap increment and increase the precursor tap, it is possible that a limit response may be returned. However, the local device is unable to determine the problem. In a first possible scenario, the precursor tap is incremented and hits its static limit, followed by the post cursor tap incrementing and hitting its static limit. Alternately, in a second scenario the precursor tap is incremented and hits either the maximum swing voltage or minimum steady state limit, followed by the post cursor tap being requested to increment. But because the link partner is already at a limit condition, the post cursor cannot be incremented and remains at the same setting.

The problem is that both scenarios generate a limit response, but the post cursor tap is only adjusted in one of the scenarios. The local device has no way to determine which event occurred, and so when it wants to reverse the tap decrements, it does not know whether the post cursor tap should be incremented or not in order to return to the optimal tap settings.

Now, if the same situation occurs while using the algorithm described in FIGS. 2 through 5, the problem is solved. Because the algorithm avoids the maximum swing voltage/minimum steady state limit, a limit reached status returned from the link partner can only occur because a static limit is reached. This means that only the first scenario (above) can occur. Knowing this, it is possible to reverse any previous tap movements.

Figure 6:
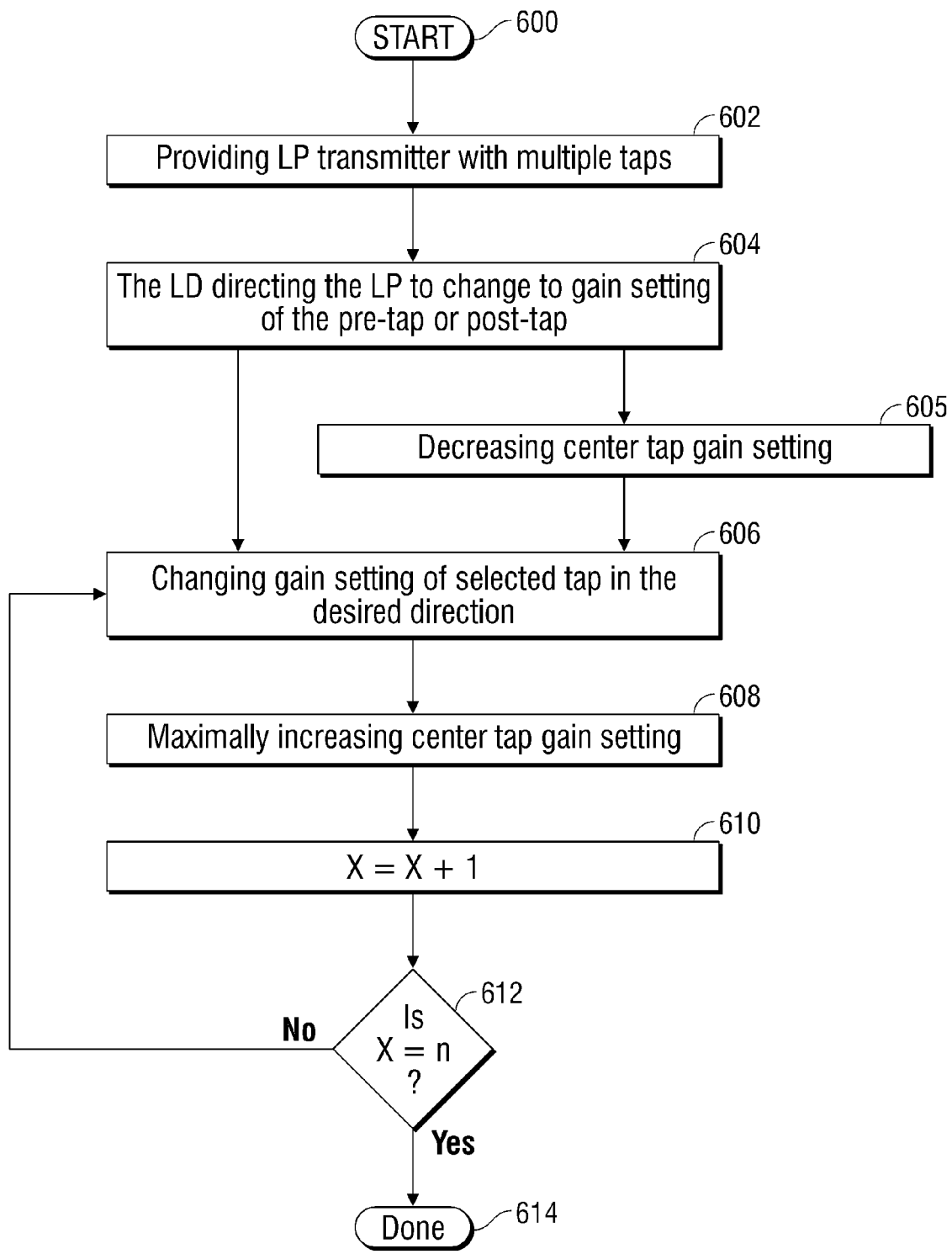
FIG. 6 is a flowchart illustrating a method for ordering tap setting modifications while avoiding minimum and maximum limitations in a link partner using a plurality of voltage gain taps.

FIG. 6 is a flowchart illustrating a method for ordering tap setting modifications while avoiding minimum and maximum limitations in a link partner using a plurality of voltage gain taps. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 600.

Step 602 provides a LP transmitter having a signal input, a plurality of parallel selectable voltage gain taps connected to the signal input, including a non-delayed pre-tap, a center tap with a delay of one unit, and a post-tap with a delay of 2 units. The LP transmitter has a network-connected output to supply the sum of the taps. Step 604 sends messages from a network-connected local device (LD) directing the LP to change the gain setting of either the pre-tap or post-tap. In one aspect, the LD directs the LP to change the gain setting of a tap in accordance with an IEEE 802.3, Clause 72 training procedure. Step 606 changes the gain setting of selected tap in the desired direction of modification. Step 608 maximally increases the center tap gain settings until a limit signal is received.

In one aspect, Step 604 directs the LP to increase the difference between the selected tap gain setting and a zero tap setting. Then, prior to Step 606, Step 605 decreases the gain setting of the center tap a first number of steps. Step 606, increases the difference between the selected tap gain setting and the zero setting a second number of steps, less than the first number.

For example, the first number may be equal to 2 and the second number equal to 1. To continue the example, in Step 604 the LD directs the LP to increase the difference between the selected tap gain setting and a zero tap setting n number of steps, where n≧1 and x is initially =zero. Then, Step 605 decreases the gain setting of the center tap 2 steps in iteration x. Step 606 increases the difference 1 step in iteration x, if a minimum/maximum limitation has not been signaled in response to decreasing the center tap setting 2 steps. Step 608 maximally increases the center tap gain in iteration x. In Step 610 one is added to x, and if x is not equal to n, Step 612 performs another iteration. If x=n (Step 614), the method is done.

Alternately, in Step 604 the LD directs the LP to decrease the difference between the selected tap gain setting and a zero tap setting. Then, Step 606 decreases the difference between the selected tap gain setting and the zero setting a second number of steps.

For example, it is assumed that the second number is equal to 1, and that in Step 604 the LD directs the LP to decrease the difference between the selected tap gain setting and a zero tap setting n number of steps, where n≧1 and x is initially =zero. Then, Step 606 decreases the difference between the selected tap gain setting and the zero setting 1 step in iteration x. In Step 608 the center tap setting is maximally increased in iteration x. Step 610 adds 1 to x, and if x is not equal to n, Step 612 performs another iteration. If x=n (Step 614), the method is done.

A system and method have been provided for ordering tap setting modifications. Examples, of particular circuitry and process flows have been given to illustrate the invention. However, the invention is not limited to merely these examples. Likewise, examples have been given in the context of an Ethernet protocol and particular data rates. Again the invention is not limited to these examples. Other variations and embodiments of the invention will occur to those skilled in the art.

We claim:

1. In a link partner using a plurality of voltage gain taps, a method for ordering tap setting modifications while avoiding minimum and maximum limitations, the method comprising:

providing a link partner (LP) transmitter having a signal input, a plurality of parallel selectable voltage gain taps connected to the signal input, including a non-delayed pre-tap, a center tap with a delay of one unit, and a post-tap with a delay of 2 units, and a network-connected output to supply the sum of the taps; and, sending messages from a network-connected local device (LD) directing the LP to increase a difference between a selected tap gain setting and a zero tap setting n number of steps, where n≧1 and x is initially=zero, where the tap is selected from the group consisting of the pre-tap and the post-tap, and where the LP increases the difference as follows:

prior to increasing the selected tap gain setting, decreasing the gain setting of the center tap two steps in iteration x;

increasing the selected tap gain setting difference one step in iteration x, when a minimum/maximum limitation has not been signaled in response to decreasing the center tap gain setting two steps:

as a final step in iteration x, increasing the center tap gain setting until a limit signal is received;

adding 1 to x; and, when x is not equal to n, performing another iteration.

2. The method of claim 1 wherein sending messages from the LD directing the LP to change the gain setting of a tap includes directing the LP to change the gain setting of a tap in accordance with an IEEE 802.3, Clause 72 training procedure.

3. The method of claim 1 wherein increasing the selected tap gain setting difference one step in iteration x, when a minimum/maximum limitation has not been signaled, includes the minimum/maximum limitation being signaled in response a factor selected from a group consisting of the center tap gain being set to its maximum gain setting and the sum of the taps signals having a voltage outside of a predetermined range of permitted voltages.

4. A local device (LD) system for ordering tap setting modifications in a link partner (LP) using a plurality of voltage gain taps, while avoiding minimum and maximum limitations, the system comprising:
  an LD signal quality module having an output to supply a tap change command selected from the group consisting of pre-tap and the post-tap change commands; and,
  an LD tap control module having an input to accept the tap change command and a network interface to supply a sequence of tap modification signals to an LP transmitter having a plurality of parallel selectable voltage gain taps connected to a signal input, including a non-delayed pre-tap, a center tap with a delay of one unit, and a post-tap with a delay of 2 units, and a network-connected output to supply the sum of the taps, the LD tap control module sending a sequence of tap modification signals including directions to increase a difference between a selected tap gain setting and a zero tap setting n number of steps, where n≧1 and x is initially=zero, as follows:
  decreasing the gain setting of the center tap two steps in iteration x;
  increasing the selected tap gain setting difference one step in iteration x, when a minimum/maximum limitation has not been signaled in response to decreasing the center tap gain setting two steps:
  as a final step in iteration x, increasing the center tap gain setting until a limit signal is received; and,
  wherein the LD tap control module adds 1 to x, and when x is not equal to n, directs to LP to perform another iteration.

5. The system of claim 4 wherein the LD tap control module sends tap change commands in accordance with an IEEE 802.3, Clause 72 training procedure.

6. The system of claim 4 wherein increasing the selected tap gain setting difference one step in iteration x, when a minimum/maximum limitation has not been signaled, includes the minimum/maximum limitation being signaled in response to a factor selected from a group consisting of the center tap gain being set to its maximum gain setting and the sum of the taps signals having a voltage outside of a predetermined range of permitted voltages.

7. In a link partner using a plurality of voltage gain taps, a method for ordering tap setting modifications while avoiding minimum and maximum limitations, the method comprising:
  providing a link partner (LP) transmitter having a signal input, a plurality of parallel selectable voltage gain taps connected to the signal input, including a non-delayed pre-tap, a center tap with a delay of one unit, and a post-tap with a delay of 2 units, and a network-connected output to supply the sum of the taps; and,
  sending messages from a network-connected local device (LD) directing the LP to decrease a difference between a selected tap gain setting and a zero tap setting n number of steps, where n≧1 and x is initially=zero, where the tap is selected from the group consisting of the pre-tap and the post-tap, and where the LP decreases the difference as follows:
  decreasing the selected tap gain setting difference one step in iteration x;
  as a final step in iteration x, increasing the center tap gain setting until a limit signal is received;
  adding 1 to x; and,
  when x is not equal to n, performing another iteration, 8. The method of claim 7 wherein sending messages from the LD directing the LP to change the gain setting of a tap includes directing the LP to change the gain setting of a tap in accordance with an IEEE 802.3, Clause 72 training procedure.

9. The method of claim 7 wherein increasing the center tap gain setting until the limit signal is received includes the limit signal being selected from a group consisting of the center tap gain being set to its maximum gain setting and the sum of the taps signals having a voltage outside of a predetermined range of permitted voltages.

10. A local device (LD) system for ordering tap setting modifications in a link partner (LP) using a plurality of voltage gain taps, while avoiding minimum and maximum limitations, the system comprising:
  an LD signal quality module having an output to supply a tap change command selected from the group consisting of pre-tap and the post-tap change commands; and,
  an LD tap control module having an input to accept the tap change command and a network interface to supply a sequence of tap modification signals to an LP transmitter having a plurality of parallel selectable voltage gain taps connected to a signal input, including a non-delayed pre-tap, a center tap with a delay of one unit, and a post-tap with a delay of 2 units, and a network-connected output to supply the sum of the taps, the LD tap control module sending a sequence of tap modification signals including directions to decrease a difference between a selected tap gain setting and a zero tap setting n number of steps, where n≧1 and x is initially=zero, as follows:
  decreasing the selected tap gain setting difference one step in iteration x;
  as a final step in iteration x, increasing the center tap gain setting until a limit signal is received;
  adding 1 to x; and,
  wherein the LD tap control module adds 1 to x, and when x is not equal to n, directs the LP to perform another iteration.

11. The system of claim 10 wherein the LD tap control module sends tap change commands in accordance with an IEEE 802.3, Clause 72 training procedure.

12. The system of claim 10 wherein increasing the center tap gain setting until a limit signal is received includes the limit signal being selected from a group consisting of the center tap gain being set to its maximum gain setting and the sum of the taps signals having a voltage outside of a predetermined range of permitted voltages.

* * * * *